(12) United States Patent
Burrowes

(10) Patent No.: US 8,288,680 B1
(45) Date of Patent: Oct. 16, 2012

(54) THIN FILM REMEDIATION AND EDGE DELETION PROCESS

(75) Inventor: Dirk Burrowes, Fitchburg, MA (US)

(73) Assignee: Vinyl Technologies, Inc., Fitchburg, MA (US)

( * ) Notice: Subject to any disclaimer, the term of this patent is extended or adjusted under 35 U.S.C. 154(b) by 415 days.

(21) Appl. No.: 12/711,724

(22) Filed: Feb. 24, 2010

(51) Int. Cl.
| | |
|---|---|
| B32B 38/10 | (2006.01) |
| B23K 26/12 | (2006.01) |
| B23K 26/14 | (2006.01) |
| B23K 26/16 | (2006.01) |
| B23K 26/36 | (2006.01) |

(52) U.S. Cl. ............. 219/121.68; 219/121.84; 156/753; 156/922

(58) Field of Classification Search ........ 219/121.65–121.72, 121.84; 156/712, 156/753, 922; 29/426.1, 426.4
See application file for complete search history.

(56) References Cited

U.S. PATENT DOCUMENTS

| | | | |
|---|---|---|---|
| 4,269,917 A * | 5/1981 | Drexler et al. ................. | 430/16 |
| 5,057,184 A * | 10/1991 | Gupta et al. .................... | 216/65 |
| 5,637,245 A | 6/1997 | Shelton et al. | |
| 5,897,685 A | 4/1999 | Goozner et al. | |
| 5,997,718 A | 12/1999 | Goozner et al. | |
| 6,129,779 A * | 10/2000 | Bohland et al. ................. | 75/714 |
| 6,391,165 B1 | 5/2002 | Bohland et al. | |
| 6,407,385 B1 | 6/2002 | Okada | |
| 6,419,996 B2 | 7/2002 | Mueller et al. | |
| 6,572,782 B2 | 6/2003 | Campo et al. | |
| 6,720,522 B2 * | 4/2004 | Ikegami et al. .......... | 219/121.69 |
| 6,777,642 B2 | 8/2004 | Song et al. | |
| 7,972,473 B2 * | 7/2011 | Wagner et al. ................ | 156/712 |

* cited by examiner

Primary Examiner — Samuel M Heinrich
(74) Attorney, Agent, or Firm — Ronald E. Smith; Smith & Hopen, P.A.

(57) ABSTRACT

An apparatus for removing heavy metals from a thin film stack. A glass or plastic substrate has a front surface and a back surface and a heavy metal thin film is deposited on the back surface. A laser is provided for generating high density radiation. A scanning means directs the high density radiation through the substrate so that the high density radiation impinges upon the heavy metal thin film. The substrate is disposed in contacting relation to a flowing liquid and a liquid bath is provided for containing the flowing liquid and collecting heavy metal that is ablated by the high density radiation. The heavy metals are filtered from the liquid bath. The same parts can also remove heavy metals from both sides of a substrate or may be used to remove only peripheral edges of a thin film stack.

10 Claims, 4 Drawing Sheets

THIN FILM REMEDIATION AND EDGE DELETION PROCESS

BACKGROUND OF THE INVENTION

1. Field of the Invention

This invention relates, generally, to reclamation of thin films. More particularly, it relates to the reclamation of heavy metals that are present in photovoltaic cells and to edge deletion of said heavy metals from photovoltaic cells.

2. Description of the Prior Art

U.S. Pat. No. 6,391,165 to Bohland et al. discloses a means of crushing and separating the various components of a solar panel to extract the heavy metals for reclamation with subsequent chemical etching and separation. The disclosed means does not prevent the toxic materials from becoming airborne and the process requires hazardous materials to separate the heavy metals.

U.S. Pat. Nos. 5,897,685 and 5,997,718 to Goozner et al. disclose acids to reclaim heavy metals from thin film solar panels. The use of such chemicals is a toxic process.

U.S. Pat. No. 6,572,782 discloses a method in which solar panels are mechanically disintegrated and then exposed to an oxygen atmosphere at high temperatures (300° C.) to achieve a gaseous decomposition. A subsequent exposure to chlorine gas at 400° C. forms $CdCl_2$ and $TeCl_4$ which condense and precipitate by cooling.

Sand blasting reclamation is also well-known but the reclamation of heavy metals or toxic materials from the sand is not easy. Moreover, the sand itself becomes toxic waste and must be disposed of as such. Sand is further used as a means to edge delete a solar panel to permit hermetic sealing of the panel from the elements. The sand can get onto the panel and damage the sensitive photovoltaic layers. Lasers are also used to edge delete but the material containing heavy metal materials become an airborne hazard in the surrounding environment.

U.S. Pat. Nos. 5,637,245, 6,407,385, 6,419,996, and 6,777,642 disclose methods for cleaning materials with a laser and liquid. None of the disclosed methods provide a safer means of extracting the heavy metals and accommodating the size of a solar panel.

However, at the time the present invention was made, it was not obvious to those of ordinary skill in view of the prior art considered as a whole how the reclamation and edge deletion process could be improved.

SUMMARY OF THE INVENTION

The long-standing but heretofore unfulfilled need for an improved reclamation and edge deletion method and apparatus for performing the steps of the method is now met by a new, useful, and non-obvious invention.

The inventive structure includes an apparatus for removing heavy or toxic metals from a thin film solar panel. A glass or plastic substrate has a front surface and a back surface and a heavy metal thin film is deposited on said back surface. The substrate must be transparent to the wavelength of light emitted by a laser so said light can pass through the substrate and be absorbed by the thin film stack.

The laser generates high density radiation. A scanning means preferably directs the high density radiation through the glass or plastic substrate so that the high density radiation impinges upon the heavy metal thin film. The scanning means includes a galvo scanner, a polygon scanner, a flying head X-Y motion system, or equivalents thereof. In the alternative, the laser beam could be stationary and the panel could be moved relative to the laser beam or a combination of both movements could be employed.

The glass or plastic substrate is disposed in contacting relation to a flowing liquid and a liquid bath is provided for containing the flowing liquid and collecting heavy metal that is ablated by the high density radiation. A filter traps the heavy metals from the liquid bath. Accordingly, heavy metal materials are effectively and efficiently separated from the liquid bath and collected in the filter for subsequent disposal or recycling. Significantly, the novel apparatus and process not only removes heavy metals from glass, said apparatus and process also removes other metals and non-metallic materials that adhere to glass or other clear materials through which the radiation may pass.

A thin film stack is removed from both sides of a substrate in a second embodiment of the invention. The same parts are used as in the first embodiment, but there are two (2) lasers, two (2) scanning means, two (2) liquids baths and two (2) filters. In all other respects, the method for removing a thin film stack from both sides of a substrate is substantially the same as the method for removing a thin film stack from one side of a substrate.

In a third embodiment, the laser light is directed by suitable lens means only to the peripheral edges of the thin film. The entire thin film is exposed to flowing liquid as in the first two embodiments, but only the illuminated peripheral edges are removed and the central part of each thin film is unaffected.

The primary object of this invention is to reclaim heavy metal or toxic materials from thin film solar panels that are being reclaimed.

A closely related object is to reclaim heavy metal or toxic materials from thin film solar panels that are being treated for edge deletion.

Another important object is to control the ablation of the films so that no vapors escape to the atmosphere.

Another object is to collect the heavy metal or toxic materials within a single containment vessel for safe and effective disposal or recycling.

Another object is to reclaim the glass panel for recycling as a solar panel.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
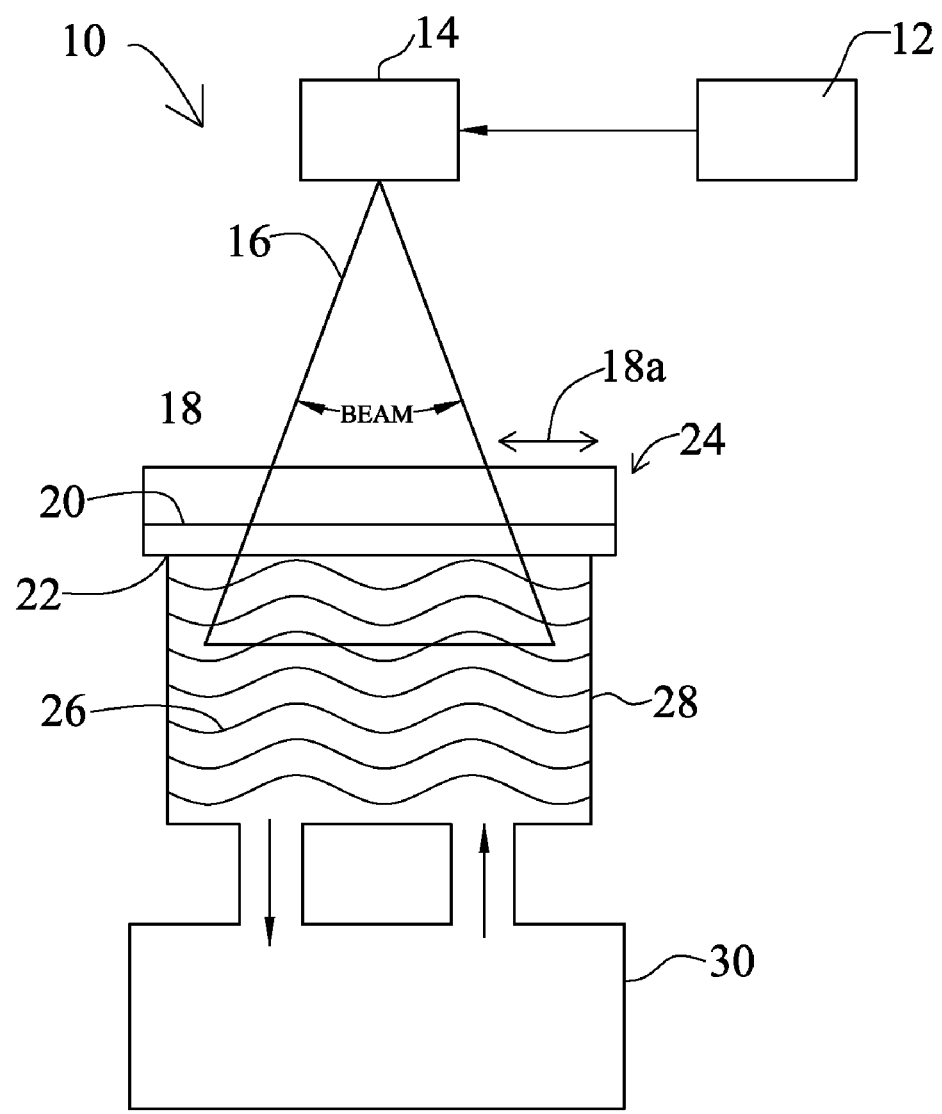
FIG. 1 is a side elevational, sectional view depicting the preferred embodiment.

Referring now to FIG. 1, it will there be seen that a diagrammatic representation of the novel apparatus is denoted as a whole by the reference numeral 10.

Novel apparatus 10 includes laser 12 and scanning means 14 that directs high density radiation 16 through substrate 18 that has a heavy metal thin film 20 deposited on back surface 22 of solar panel 24. Solar panel 24 is then placed on top of a liquid 26 that flows through liquid bath container 28. Beam 16 of laser 12 ablates heavy metal thin film 20 and heavy metals are collected within liquid bath container 28 as flowing liquid 26 removes the ablated heavy metals. Filter 30 filters the heavy metals from liquid bath container 28 so that the toxic heavy metal materials transported by flowing liquid 26 are effectively and efficiently disposed of or recycled. The filter is preferably of the porous type that traps minimum particle sizes. Chemical separation means or separation through specific gravity processes are also within the scope of this invention.

The novel apparatus advances the art by more effectively, efficiently and safely containing toxic heavy metal films so that the heavy metals can be more easily collected for subsequent disposal or recycling.

Figure 2:
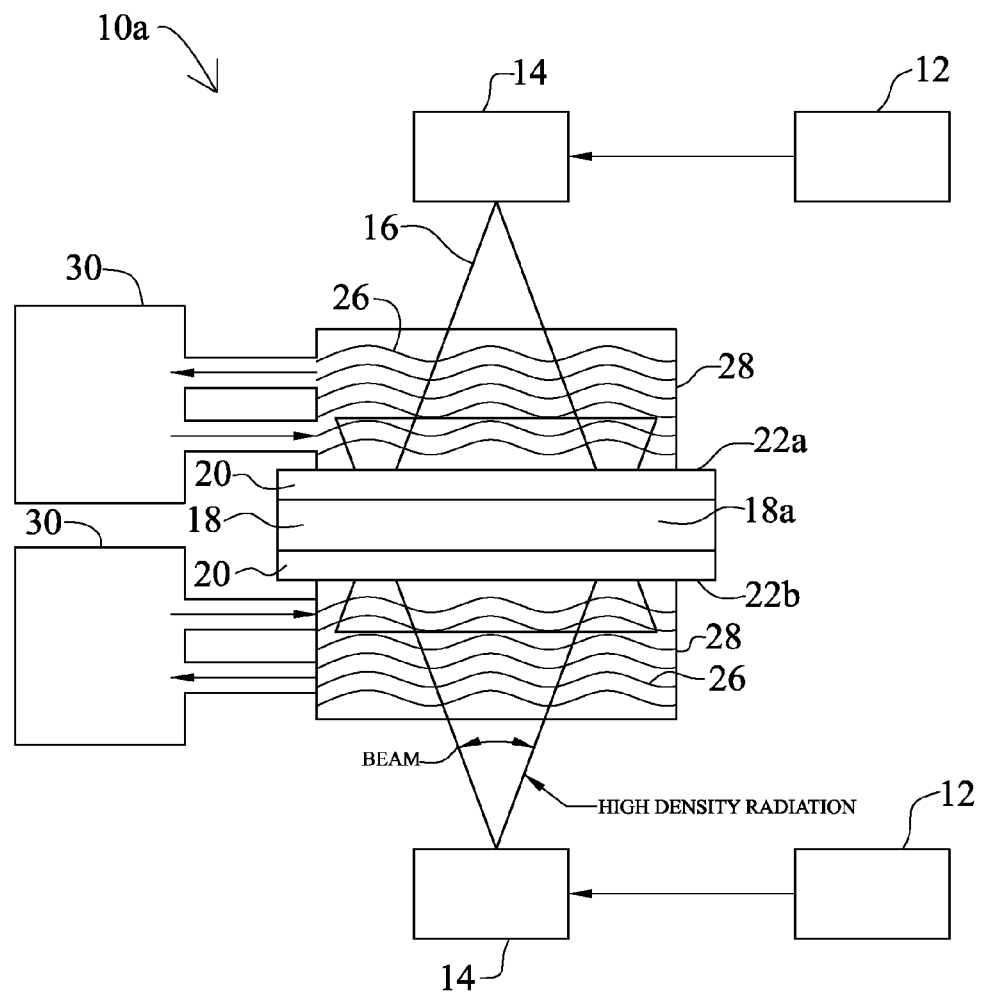
FIG. 2 is a side elevational, sectional view depicting a second embodiment where the film stack is illuminated through a liquid bath from both sides of a panel.

FIG. 2 depicts an embodiment, denoted 10a as a whole, where a thin film of heavy metals overlies two (2) sides of glass or plastic substrate 18. Two containers 28 filled with flowing liquid 26 are used in this embodiment, together with two (2) lasers 12 and two (2) scanning means 14. Each container 28 is in fluid communication with a filter means 30. The surfaces that are exposed to the flowing liquid are denoted 22a and 22b. This system performs in substantially the same way as the embodiment of FIG. 1, Therefore, common reference numerals refer to like parts.

Figure 3A:
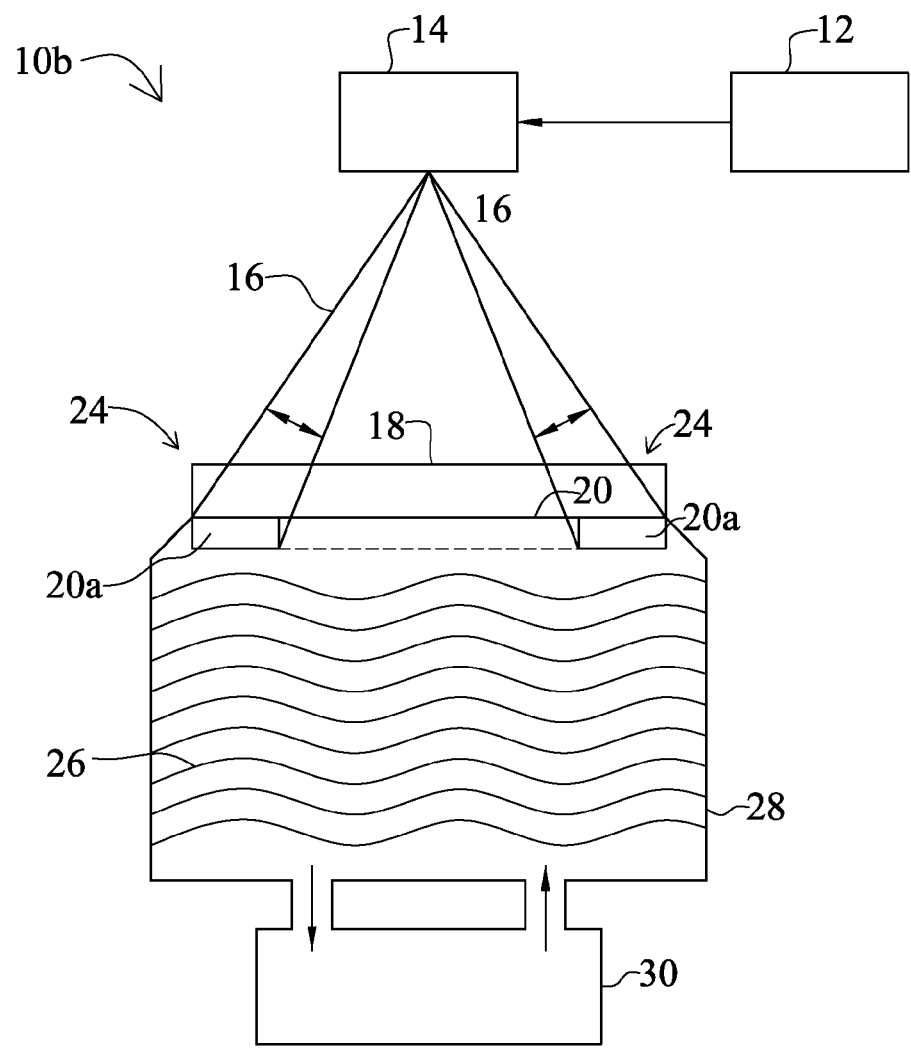
FIG. 3A is a side elevational, sectional view depicting the novel edge deletion method.
Figure 3B:
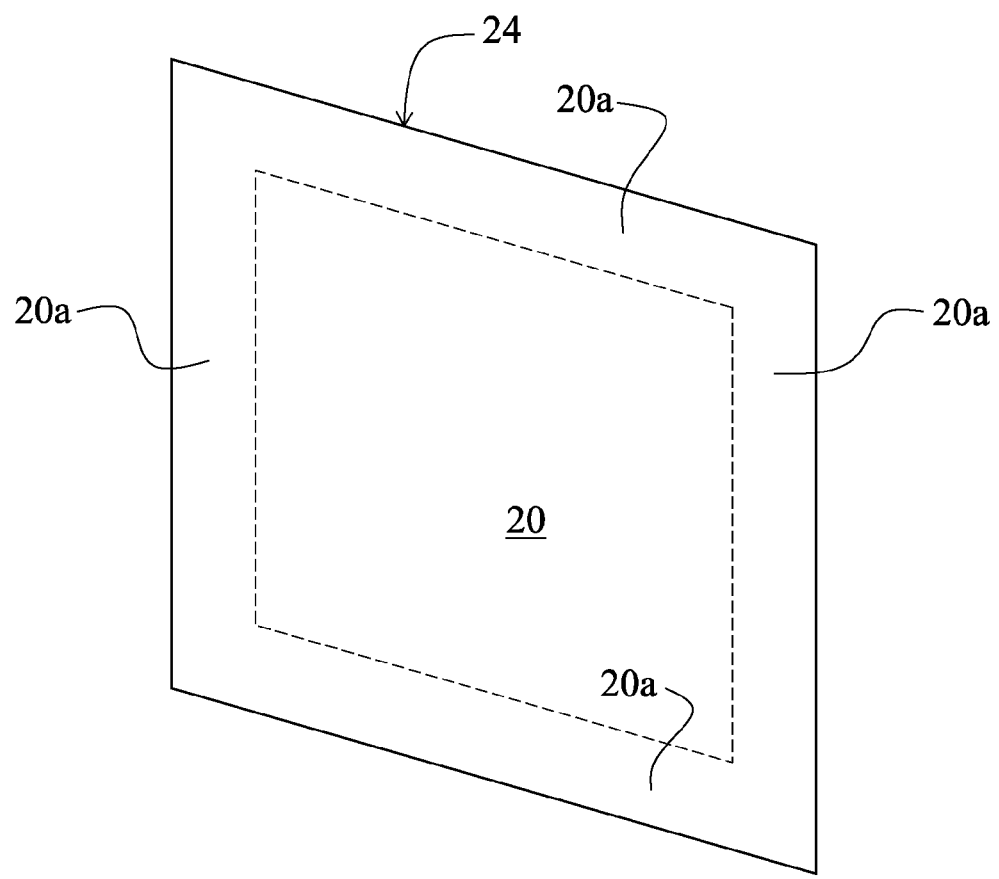
FIG. 3B is a perspective view of a solar panel depicting the edges that are removed by the novel method.

FIG. 3A depicts how the same parts and substantially the same method are used to perform the novel edge deletion method. The parts that this embodiment shares with the respective embodiments of FIGS. 1 and 2 are denoted with common reference numerals. This method is used in connection with a solar panel 24 having a thin heavy metal film stack 20 from which it is desired to remove peripheral edges 20a therefrom, as perhaps best understood in connection with FIG. 3B. As depicted, laser beams 16 illuminate only said peripheral edges 20a of thin film stack 20. This removes said peripheral edges 20a without affecting the central part of thin film stack 20 as depicted in FIG. 3B.

Thus it is understood that contact with flowing liquid 26 alone has no effect upon thin film stack 20; it is the combination of said flowing liquid flowing against a thin film stack 20 that is illuminated by a laser means that accomplishes the removal. In the first two embodiments, all of thin film stack 20 is illuminated and all of said thin film stack is in contact with flowing water 26 so all of said thin film stack is removed. In the third embodiment, the width of the peripheral edges removed is determined by the width of the laser beam that illuminates it.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall there between.

What is claimed is:

1. An apparatus for removing heavy metals from a thin film, comprising:

a transparent substrate having a front surface and a back surface;

a heavy metal thin film deposited on said back surface;

a laser for generating high density radiation;

a scanning means for directing said high density radiation through said transparent substrate so that said high density radiation impinges upon said heavy metal thin film;

a flowing liquid;

said heavy metal thin film deposited on said back surface being disposed in contacting relation to said flowing liquid;

a liquid bath container for containing said flowing liquid and collecting heavy metal that is ablated by said high density radiation;

a filter for filtering said heavy metals from said liquid bath;

whereby said heavy metal materials are effectively and efficiently separated from said liquid bath and collected in said filter for subsequent disposal or recycling.

2. The apparatus of claim 1, further comprising:

said transparent substrate being formed of glass.

3. The apparatus of claim 1, further comprising:

said transparent substrate being formed of plastic.

4. An apparatus for removing heavy metals from a thin film, comprising:

a transparent substrate having a front surface and a back surface;

a first heavy metal thin film deposited on said front surface;

a second heavy metal thin film deposited on said back surface;

a first laser for generating high density radiation;

a first scanning means for directing said high density radiation through said transparent substrate so that said high density radiation impinges upon said first heavy metal thin film;

a first flowing liquid;

said first heavy metal thin film deposited on said front surface being disposed in contacting relation to said first flowing liquid;

a first liquid bath container for containing said first flowing liquid and collecting heavy metal that is ablated by said high density radiation emitted by said first laser;

a first filter in fluid communication with said first liquid bath for filtering said first heavy metals from said first liquid bath;

a second laser for generating high density radiation;

a second scanning means for directing said high density radiation emitted by said second laser through said transparent substrate so that said high density radiation emitted by said second laser impinges upon said second heavy metal thin film;

a second flowing liquid;

said second heavy metal thin film deposited on said back surface being disposed in contacting relation to said second flowing liquid;

a second liquid bath container for containing said second flowing liquid and collecting heavy metal that is ablated by said high density radiation emitted by said second laser;

a second filter in fluid communication with said second liquid bath for filtering said second heavy metals from said second liquid bath;

whereby said heavy metal materials are effectively and efficiently separated from said first and second liquid baths and collected in said first and second filters for disposal or recycling.

5. The apparatus of claim 4, further comprising:
said transparent substrate being formed of glass.

6. The apparatus of claim 4, further comprising:
said transparent substrate being formed of plastic.

7. An apparatus for removing heavy metals from a thin film, comprising:

a transparent substrate having a front surface and a back surface;

a heavy metal thin film deposited on said back surface;

a laser for generating high density radiation;

a scanning means for directing said high density radiation through said transparent substrate so that said high density radiation impinges only upon peripheral edges of said heavy metal thin film;

a flowing liquid;

said heavy metal thin film deposited on said back surface being disposed in contacting relation to said flowing liquid;

a liquid bath container for containing said flowing liquid and collecting heavy metal that is ablated from said peripheral edges by said high density radiation;

a filter for filtering said heavy metals from said liquid bath;

whereby said heavy metal materials at said peripheral edges are effectively and efficiently separated from said liquid bath and collected in said filter for subsequent disposal or recycling.

8. The apparatus of claim 7, further comprising:
said transparent substrate being formed of glass.

9. The apparatus of claim 7, further comprising:
said transparent substrate being formed of plastic.

10. An apparatus for removing materials from a transparent substrate, comprising:

said transparent substrate having a front surface and a back surface;

a thin film of materials deposited on said back surface;

a laser for generating high density radiation;

a scanning means for directing said high density radiation through said transparent substrate so that said high density radiation impinges upon said thin film of materials;

a flowing liquid;

said thin film of materials deposited on said back surface being disposed in contacting relation to said flowing liquid;

a liquid bath container for containing said flowing liquid and collecting materials forming said thin film that is ablated by said high density radiation;

a filter for filtering said materials from said liquid bath;

whereby said materials are effectively and efficiently separated from said liquid bath and collected in said filter for subsequent disposal or recycling.

\* \* \* \* \*